Jan. 20, 1925.
J. W. BULLER
1,523,858
CLUTCH AND BRAKE HOLDER FOR TRACTORS
Filed July 8, 1924
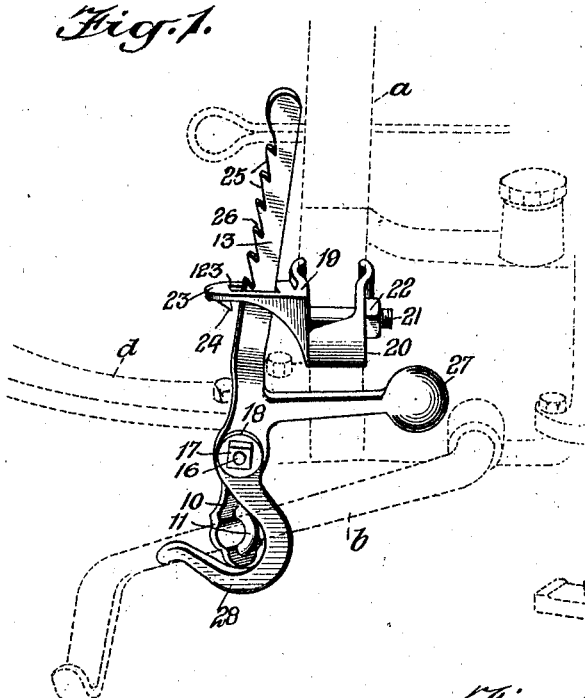
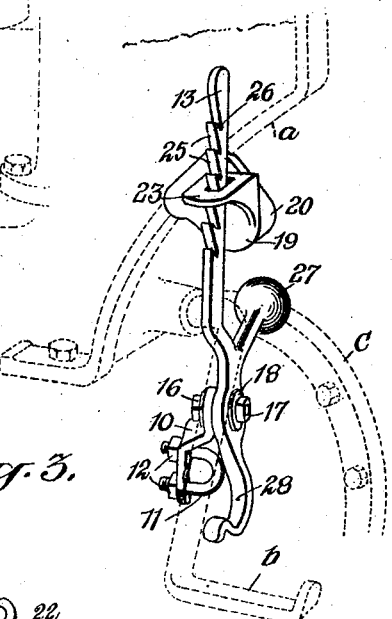
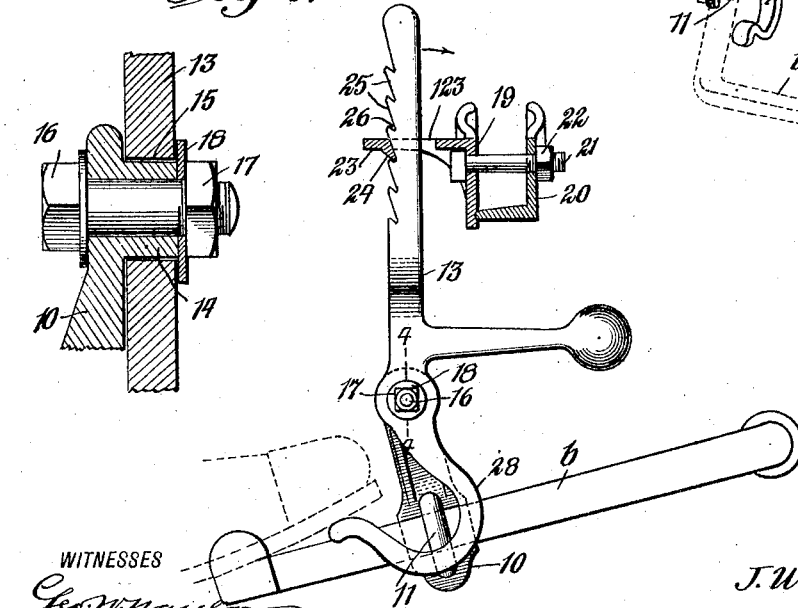
WITNESSES
INVENTOR
J. W. Buller
BY
ATTORNEYS

Patented Jan. 20, 1925.

1,523,858

UNITED STATES PATENT OFFICE.

JACOB WIENS BULLER, OF HILLSBORO, KANSAS.

CLUTCH AND BRAKE HOLDER FOR TRACTORS.

Application filed July 8, 1924. Serial No. 724,831.

*To all whom it may concern:*

Be it known that I, JACOB W. BULLER, a citizen of the United States of America, and a resident of Hillsboro, in the county of Marion and State of Kansas, have invented a new and Improved Clutch and Brake Holder for Tractors, of which the following is a description.

My invention relates to a clutch and brake holder for tractors and more particularly designed for use on Fordson tractors.

The general object of my invention is to provide a novel clutch and brake holder so formed and arranged and so disposed relatively to the clutch pedal that the holder will automatically tend to assume an unlocking position but may be thrown into locking position with the depression of the pedal; a further object being to utilize the clutch spring to maintain the holder in locking position.

More specifically, the invention has for an object to provide a device for the indicated purpose characterized by strength and simplicity and the facility with which the device may be assembled, emplaced and operated.

The manner and means whereby the above and other objects are obtained will clearly appear as the description proceeds.

Reference is to be had to the accompanying drawings forming a part of this specification, it being understood that the drawings are merely illustrative of one example of the invention.

Figure 1 is a perspective view of a clutch and brake holder embodying my invention, showing the same emplaced on a tractor, portions of which are indicated in dotted lines;

Figure 2 is a similar view taken at a different angle and looking more toward the front of the tractor;

Figure 3 is a partly sectional side elevation of the holder and the clutch pedal;

Figure 4 is a detail in vertical section in a plane indicated by the line 4—4, Figure 3.

In the illustrated example of my invention, the letter *a* indicates the dash frame of a tractor; *b*, the clutch pedal; and *c* and *d* frame members of the tractor.

In accordance with my invention I provide a clamp bracket 10 adapted to be affixed to the clutch pedal *b*, use being made for the purpose in the illustrated example of a U-bolt or shackle 11 embracing the clutch pedal *b* and having nuts 12. A lock arm 13 is pivoted to the upper end of the bracket 10. For the purpose said bracket 10 is formed with a lateral hub 14 which is entered in a transverse hole 15 in said arm 13. A bolt 16 passes through the bracket 10 at the hub 14 and receives a nut 17 and washer 18.

Means is provided to lock the arm 13 to the dash frame member *a*, the means in the illustrated example consisting of clamp jaws 19, 20, the latter of angle form, the clamp being completed by a transverse bolt 21, passing through said jaws and receiving a nut 22 to firmly bind the jaws on the frame member *a*. A lateral guide and locking member 23 is integral with the jaw 19 and has a vertical hole 123 through which the arm 13 passes. A fixed dog 24 is formed on the member 23 at an end of the hole 123 and is adapted to engage one of a plurality of teeth 25 on said arm 13. The interdental spaces 26 of arm 13 are at a sharp angle and the dog 24 is correspondingly disposed so that when the said arm is moved to a position to be engaged by the dog 24, the tension of the usual clutch spring (not shown) exerting upward pressure on the bracket 10 and arm 13 will maintain the dog 24 in engagement with the toothed edge of said arm 13.

In order to normally give the lock arm 13 a tendency to assume an unlocked position I provide a weight arm 27 extending laterally from said lock arm. The weight arm 27 is so disposed that it tends to maintain the lock arm 13 against that end of the slot 123, remote from the locking dog 24 to thus hold said lock arm out of engagement with said dog. Thus, it becomes necessary to manually throw the lock arm 13 into locking position which is readily done as follows: The lower end 28 of the lock arm 13, that is to say, the end below the pivot bolt 16 is given a hook form, the bill of the hook lying adjacent to the clutch pedal *b* so that the foot of the driver may as indicated in dotted lines, Figure 3, depress the clutch pedal *b* and at the same time by engaging the hook 28 rock the arm 13 to a position to be engaged with dog 24 when the clutch pedal (*b*) is relieved of the pressure of the foot and the pedal allowed to rock upwardly under the tension of the usual clutch spring.

By the described arrangement the clutch pedal may be operated in the same manner as if the clutch holding device was not present; yet, the lock arm may be optionally thrown into the locking position when the operator places his foot on the hook 28. My improved device is especially useful when doing what is generally termed belt work with the tractor as well as when the stopping of the tractor is necessary for a short time as this can be effected without shifting the gear lever, even while the motor is continued running.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A device of the class described adapted to be emplaced on a tractor for holding the clutch and brake and comprising a bracket having means to clamp it to the clutch pedal of the tractor, to be subject to the clutch spring of the tractor so that said bracket normally is given a tendency to move upwardly with the clutch pedal, a lock arm pivoted between its ends to said bracket to rock in approximately a vertical plane, a second bracket having means to clamp it to a fixed frame part of the tractor above the first bracket, said second bracket having a lateral guide member formed with a vertical slot therein through which the upper portion of the lock arm extends, said lock arm being formed on an edge thereof with teeth and presenting interdental spaces at a sharp angle, said teeth disposed toward one end of said slot, a fixed locking dog on said lateral guide member at that end adjacent the said teeth, and a weight arm on the lock arm normally tending to dispose the lock arm at that end of the slot remote from the locking dog, said lock arm below its pivot being in the form of a hook disposed adjacent to the first-mentioned bracket so as to lie adjacent to the clutch pedal, said lock arm being dependent for engagement with said dog on the upward movement of the first bracket and the lock arm under the pressure exerted on the clutch pedal by the clutch spring.

2. A device of the class described adapted to be emplaced on a tractor for holding the clutch and brake, said device including a bracket having means to clamp it to the clutch pedal of the tractor, to be subject to the upward pressure exerted on the clutch pedal by the clutch brake of the tractor, a lock arm pivoted between its ends on said bracket, a clamp bracket adapted to be secured to a fixed frame part of the tractor, a member on said clamp bracket embracing the lock arm above the pivot thereof, co-engaging locking devices on the lock arm and on said member of the clamp bracket, and a weighted arm on the lock arm normally tending to hold the lock arm in unlocking position.

JACOB WIENS BULLER.